United States Patent
Kajino et al.

[11] Patent Number: 5,844,671
[45] Date of Patent: Dec. 1, 1998

[54] LENS METER

[75] Inventors: Tadashi Kajino, Okazaki; Masanao Fujieda, Toyohashi, both of Japan

[73] Assignee: Nidek Co., Ltd., Aichi, Japan

[21] Appl. No.: 827,729

[22] Filed: Apr. 8, 1997

Related U.S. Application Data

[62] Division of Ser. No. 685,601, Jul. 24, 1996, Pat. No. 5,684,576.

[30] Foreign Application Priority Data

| Jul. 27, 1995 | [JP] | Japan | 7-212661 |
| Jul. 31, 1995 | [JP] | Japan | 7-215433 |
| Aug. 7, 1995 | [JP] | Japan | 7-222694 |

[51] Int. Cl.$^6$ .................................................. G01B 9/00
[52] U.S. Cl. ........................................ 356/124; 356/127
[58] Field of Search ................................. 356/124, 125, 356/127

[56] References Cited

U.S. PATENT DOCUMENTS

| 4,730,924 | 3/1988 | Allard et al. | 356/125 |
| 4,779,979 | 10/1988 | Iwane | 356/125 |
| 4,826,315 | 5/1989 | Kohayakawa | 356/125 |
| 5,173,739 | 12/1992 | Kurachi et al. | 356/124 |
| 5,231,460 | 7/1993 | Kohayakawa | 356/125 |
| 5,247,341 | 9/1993 | Kurachi et al. | 356/127 |
| 5,349,433 | 9/1994 | Iwane | 356/124 |
| 5,379,111 | 1/1995 | Kajino et al. | 356/124 |
| 5,521,700 | 5/1996 | Kajino et al. | 356/124 |

FOREIGN PATENT DOCUMENTS

| 0 193 897 | 9/1986 | European Pat. Off. . |
| 58 156828 | 9/1983 | Japan . |
| 60-17335 | 1/1985 | Japan . |
| 6-160239 | 6/1994 | Japan . |
| WO 94 02805 | 2/1994 | WIPO . |

*Primary Examiner*—F. L. Evans
*Attorney, Agent, or Firm*—Oliff & Berridge, PLC

[57] ABSTRACT

A lens meter having a measuring optical system comprises a device for measuring an optical characteristics continuously, a device for introducing the lens to the desired positional relation for a measuring optical axis in the measuring optical system on the basis of the measured data, a device for generating the alignment ending signal when the alignment is achieved to the predetermined standard level, a device for judging whether the measured data is stable within a predetermined permissible range of the variation, and a device for storing the measured data of the lens based on the judgment result. This apparatus further comprises a device for designating which the left or right lens should be measured, a device for generating the signal for reading-and-storing the measured data, a device for storing the measurement result, a device for detecting whether the lens exists on the measuring optical axis, and a device for judging the changing-over of the left or right of the lens. This apparatus further comprises a device for changing-over a mode to measure an additive diopter in the progressive multi focus lens, a device for inputting which the lens is for left or right, a device for detecting a displacement of a measuring position, a device for conducting to a right and left reference axis of the lens, a device for conducting a measuring position closed to the near viewing section from the far viewing section, and a device for displacing the measuring position closed to the near viewing section to the predetermined nose position.

10 Claims, 8 Drawing Sheets

LENS METER

This is a Division of application Ser. No. 08/685,601 filed Jul. 24,1996, now U.S. Pat. No. 5,684,576.

BACKGROUND OF THE INVENTION

1. Field of the Invention

The present invention relates to a lens meter, and more particularly relates to a lens meter for use in measuring the optical characteristics of a lens.

2. Description of Related Art

A lens meter is well known in which a measuring light flux is projected against a lens to be examined and a measuring light receiving element and then the optical characteristics of the lens can be obtained in response to the result of detection.

In order to mark on a lens before framing, or measure the optical characteristics of the lens after framing, it is important to adjust accurately the measuring optical axis to the predetermined position of the lens (optical center of the lens, or displacement position with respect to the prescribed prism, for example). In the conventional lens meter, the measured data reading switch is depressed after the lens is shifted to a predetermined position between a reticle and measuring target and is stopped.

In addition, the lens mounted into a spectacle frame used to be measured as follows. At first, the operator designates a lens which should be measured by a left-right designation switch. The operator puts the designated lens on the measuring optical axis by holding the spectacle. After alignment is completed, the operator depresses a measured data read-and-store switch so as to store the measurement data. Next, the operator designates the other lens by using the left-right designation switch again, then changes the lens on the measuring optical axis to another. After alignment, the operator again depresses the measured data read-and-store switch for the measured data in order to store them. After the measurement of both lenses is completed, the stored measurement results are output by pressing a print switch.

Moreover, in the case of a lens meter having a measuring additive diopter mode for measuring the additive diopter in a progressive focus lens, the lens is shifted and placed at the measurement position in the far viewing section so as to measure. After shifting the measurement position passed by a progressive section to move the measurement position in the near viewing section, the additive diopter is calculated in reference to the difference of the spherical degree in between the far and the near viewing section.

However, as a disadvantage, it was inconvenient that in measuring the optical characteristics of the lens before framing, the operator had to shift the lens by observing a reticle and a measuring target at the same time. The operator also had to depress the measured data read-and-store switch. Also the fixed measurement position of the lens sometimes shifted out of position when the operator depressed the measured data read-and-store switch. Therefore a relative accurate measurement result could not be obtained.

Further, in measuring the optical characteristics of the lens after framing, as the operator manages the alignment by holding the spectacle frame by hand, it is inconvenient to depress the left-right designation switch, after the measurement of the lens is finished. Moreover, many selection of switches caused the operator to hesitate as to which switch should be depressed or to not depress the switch. Therefore, the measurement could not be conducted smoothly.

In addition, in the conventional apparatus, although it is proposed that the operation of the left-right designation switch should be unnecessary, such as for sensing the right and left side of the speculate frame or for sensing the right and left side of the lens by using a slider which can shift from left to right, it comes to another disadvantage that this structure of sensing system must be complicated.

Further, in measuring the additive diopter in the progressive focus lens, as the non-framed lens is applied with marks on the respective position of the far viewing section and the near viewing section, the operator can shift and measure the lens by following the marks. But in the case of the framed lens, since the mark should be wiped off for cleaning, the measurement position depends on the judgement of the operator and the correctness of the judgement relies on the substantial skill of the operator.

Also in some of the conventional apparatus, there is provided a display device for displaying the additive diopter measured constantly. According to this apparatus, by checking the display of the additive diopter, it is possible to align the measuring point at the near viewing section by shifting the lens up and down in direction so as to maximize the measurement value. However, as against the center at the far viewing section, the right and left direction in the center at the near viewing section is usually placed out of the nose position when contacting on (most of lenses on the market should be out of the position about 1.5 mm~2.5 mm), it is difficult to align in the right and left direction. Therefore, there used to be some problems of the reliance for the measurement result.

SUMMARY OF THE INVENTION

The present invention has been made in view of the above circumstances and has an object to overcome the above problems and to provide, as its technical issue, a lens meter improving the operation of measurement and measuring with high accuracy the optical characteristics of the non-framed lens.

It is another object of the present invention to provide a lens meter capable of simplifying switches operation smoothly as possible without containing the sensing system for the complicated structure to measure the optical characteristics of the framed lens.

It is a further object of the present invention to provide a lens meter capable of performing an alignment to measure the additive diopter and obtaining the high reliable measurement result of the additive diopter.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a lens meter of this invention having a measuring optical system in which a measuring light flux is projected against a lens to be examined and the measuring light flux transmitted through the lens is received onto a light receiving element, the optical characteristics of the lens are measured on the basis of the detecting result by the light receiving element in the measurement optical system, comprises a measuring control means for measuring an optical characteristics continuously by controlling a measuring optical system, an alignment means for introducing the lens to the desired positional relation for a measuring optical axis in the measuring optical system on the basis of the measured data by the measuring control means, an alignment ending signal generating means for generating an alignment ending signal when the alignment is achieved to the predetermined standard level by the alignment means, a judging means for judging whether the measured data is stable within a predetermined permissible limits of the variation by the measuring control means, and a memory means for storing the measured data of the lens to be examined based on the judgment result by the judging means and the signal by the alignment ending signal generating means.

In another aspect of the present invention, the lens meter comprises a right and left designation means for designating which of the left or right lens should be measured in advance, a measuring means for measuring a refractive power of the lens, a measured data read-and-store signal generating means for generating a measured data read-and-store signal, a memory means for storing the measurement result of the lens by the measured data read-and-store signal, a detecting means for detecting whether the lens exists on the measuring optical axis, and a right and left changing-over judging means for judging the changing-over of the right and left lens on the basis of the detecting result by the detecting means.

Also, in another aspect of the present invention, the lens meter comprises a right and left designation means for designating which of the left or right lens should be measured in advance, a measuring means for measuring a refractive power of the lens, a measured data read-and-store signal generating means for generating a measured data read-and-store signal, a memory means for storing the measurement result of the lens by the measured data read-and-store signal, a detecting means for detecting whether the lens exists on the measuring optical axis, measurement end judging means for judging to complete both of the measurement of the right and left lens in response to a detecting result by the detecting means, and a control means for controlling an operation of printing or outputting means based on a judgement by the measurement end judging means for judging the end of the measurement.

Also, another aspect of the present invention, the lens meter comprises a right and left designation means for designating which of the left or right lens should be measured in advance, a measuring means for measuring a refractive power of the lens, a measured data read-and-store signal generating means for generating a measured data read-and-store signal, a memory means for storing the measurement result of the lens by the measured data read-and-store signal, an input means for inputting either a measuring mode or a multifocus lens measuring mode, and a right and left changing-over judging means for judging the changing-over of the right and left lens on the basis of the measured data read-and-store signal in the case that the lens is a single-focus lens in response to the input means.

Also, another aspect of the present invention, the lens meter comprises a mode changing-over means for changing over a mode to measure an additive diopter in the progressive multifocus lens, a right and left side input means for inputting which the lens is for left or right, a measuring means for measuring a refractive power of the lens at the predetermined interval continuously, a displacement detecting means for detecting a displacement of a measuring position, a first conduction means for conducting to a right and left reference axis of the lens based on the measurement result by the measuring means, a second conduction means for conducting a measuring position closed to the near viewing section passed along a progressive section from the far viewing section, and a third conduction means for displacing the measuring position closed to the near viewing section to the predetermined nose position far from the right and left reference base axis.

According to the present invention, it is capable of judging the reliability for the measured data and dealing the measured data automatically, as result of this, there is no inconvenience for switch operation. Furthermore, according to the present invention, the lens meter is capable of simplifying switch operation without complicating the structure of the apparatus in order to realize a highly smooth operation. In addition to the present invention, it is capable of aligning a progressive lens for the additive diopter of the measured data, and especially the alignment in the right and left direction where the center of the near viewing section in positioned is achieved extremely easily. As the result of this, it is possible to obtain the most reliable measured result.

BRIEF DESCRIPTION OF THE DRAWINGS

The accompanying drawings, which are incorporated in and constitute a part of this specification illustrate embodiments of the present invention and, together with the description, serve to explain the objects, advantages and principles of the invention. In the drawings.

DETAILED DESCRIPTION OF THE PREFERRED EMBODIMENTS

A detailed description of one preferred embodiment of a lens meter embodying the present invention will now be given referring to the accompanying drawings.

Figure 1:
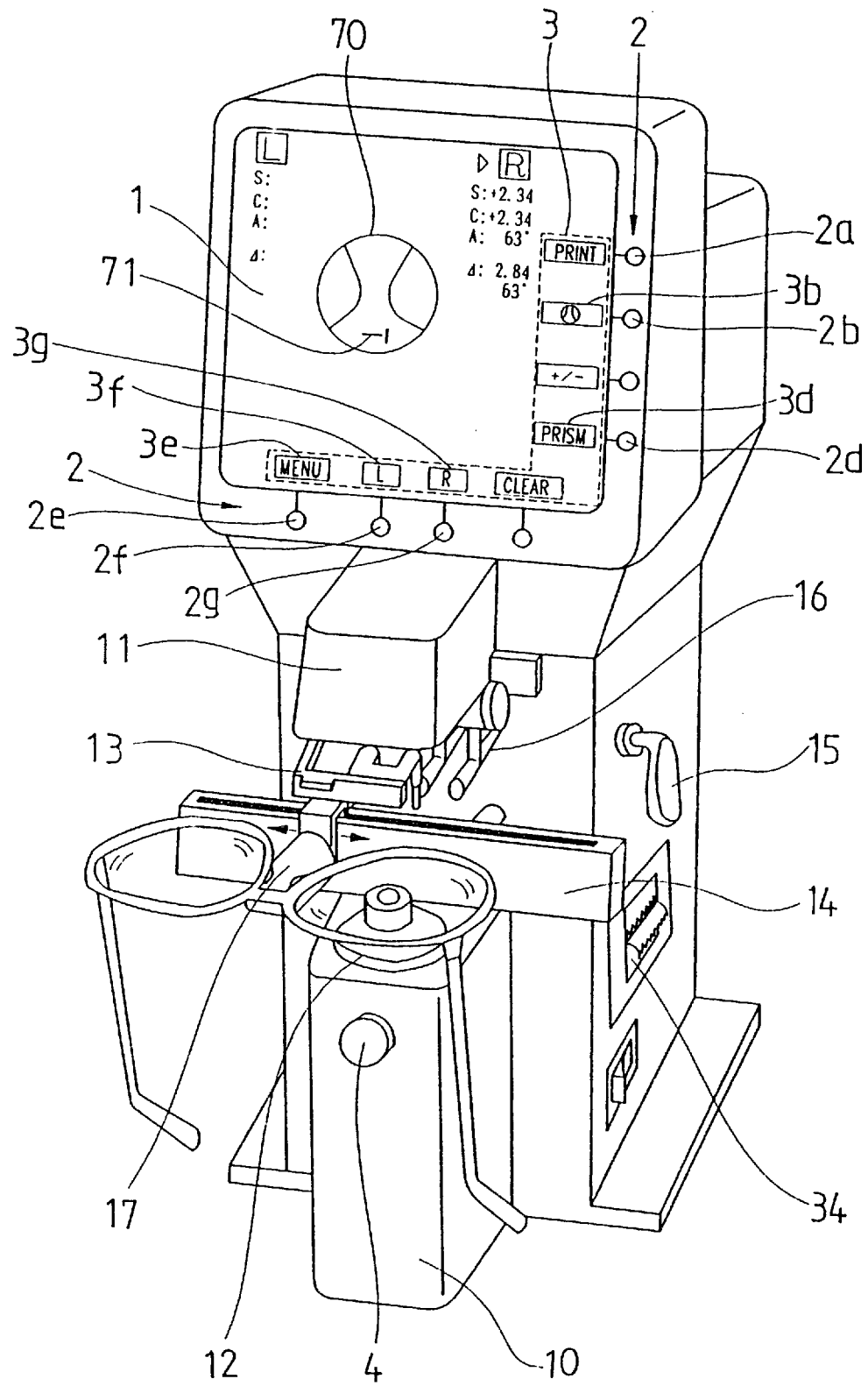
FIG. 1 shows an outer appearance of a lens meter of one preferred embodiments of the present invention.

FIG. 1 shows an outer appearance of a lens meter of the preferred embodiment. Reference numeral 1 denotes a display of LCD and the like for use in displaying various information such as a target, measuring information, a set screen and the like for alignment. Reference numeral 2 denotes a group of switches, wherein a switch corresponding to a switch display 3 displayed at a predetermined position in the display 1 is depressed to enable the device to be operated and various kinds of items to be set. On the switch display 3 at the measuring screen are present various kinds of switch displays such as right-left selection switch displays 3f and 3g, a print switch display 3a, a measuring mode changing-over switch display 3b and a menu switch display 3e for setting parameters and the like.

Every time the switch 2b corresponding to the measuring mode change-over switch display 3b is depressed, a mode for measuring a single-focus lens and another mode for measuring a progressive focus lens can be selected in sequence and the measuring screen is correspondingly changed over. In addition, when the switch 2e corresponding to the menu switch display 3e is depressed, the contents of the switch display and graphic display of the display 1 can be changed over and then various kinds of settings can be carried out under the operation of the switch group 2. Reference numeral 4 denotes a READ switch for use in reading-and-storing measured values.

Reference numerals 10 and 11 denote storing bodies for storing a measuring optical system to be described later, wherein the storing body 10 is provided with a nose piece 12 for mounting a lens and the examined lens is held by lowering a lens fixer 13.

Reference numeral 14 denotes a lens receiver for use in setting a position of the examined lens in its forward or rearward direction, wherein the lens receiver 14 is held in such a manner that it can be moved in a forward or rearward direction in respect to the device. Reference numeral 15 denotes a moving lever for the lens receiver 14, and reference numeral 16 denotes a marking device.

Reference numeral 17 denotes a nose pad to be abutted against nose pads of a spectacle frame when a framed lens is measured, wherein the nose pad 17 is held in such a manner that it can be moved in the lens receiver 14 in a lateral direction. Reference numeral 34 denotes a printer for use in printing out the measurement result.

Figure 2:
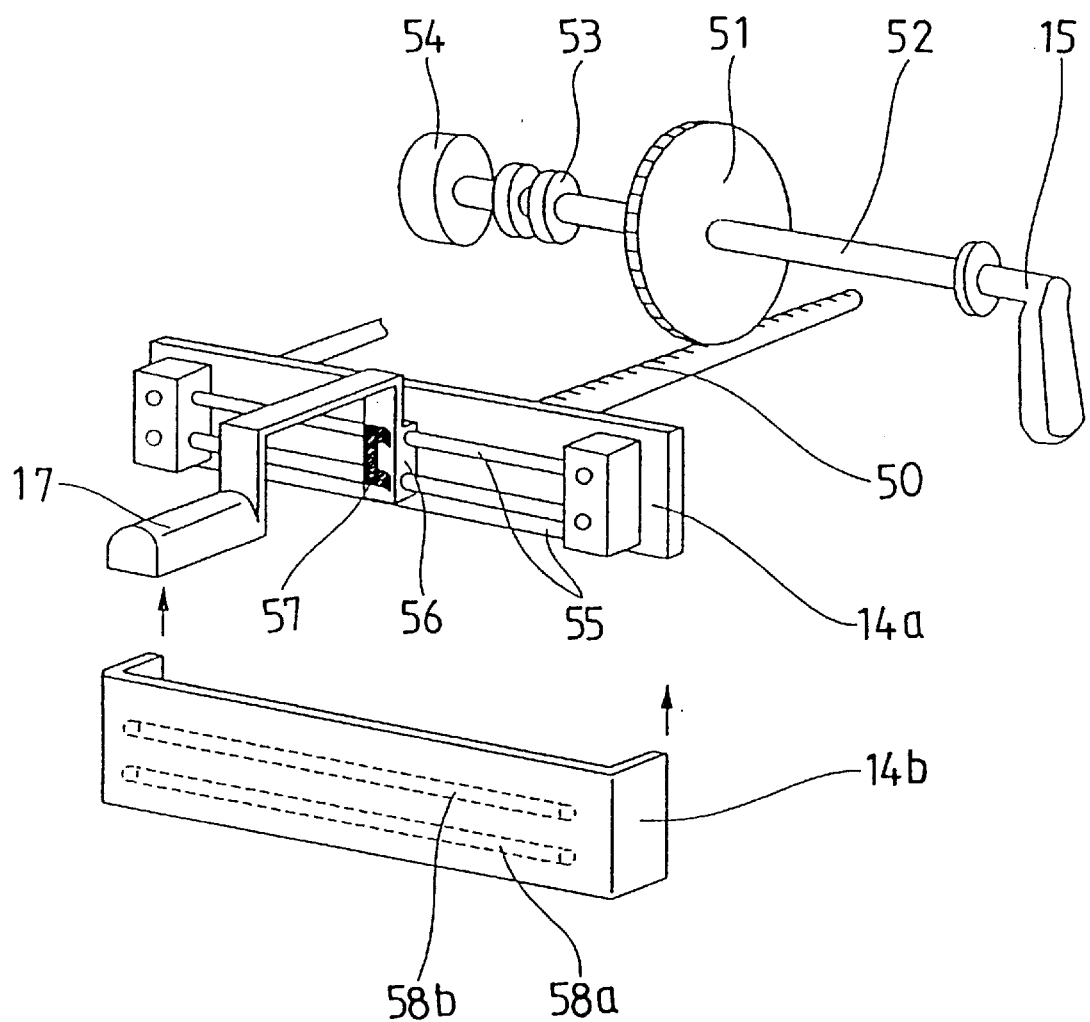
FIG. 2 is a view for illustrating a mechanism sensing movement positions in the forward or rearward direction and the rightward or leftward direction of a lens to be examined in the lens meter shown in FIG. 1.

FIG. 2 is a view for illustrating a mechanism for sensing the movement positions of the examined lens in the forward or rearward direction and the lateral direction, respectively. Reference numeral 50 denotes a rack fixed to a rear plate 14a of the lens receiver 14, wherein the rack 50 is held in the device in such a manner that it can be moved in a forward or rearward direction. To the rack 50 is engaged a pinion 51, and a shaft 52 passes through the pinion 51 and fixed there. To one end of the shaft 52 is fixed a moving lever 15 and to the other end of the shaft 52 is fixed a potentiometer 54 through a flexible coupling 53. Upon rotation of the moving lever 15, the rack 50 is moved in a forward or rearward direction together with the lens receiver 14 under the rotation of the pinion 51 and concurrently the rotation is transferred to the potentiometer 54. With such an arrangement as above, an amount of motion of the lens receiver 14 in the forward or rearward direction is detected by the potentiometer 54.

To the lens receiver rear plate 14a are fixed two rails 55 extending in parallel from each other in a lateral direction through fixing members, wherein the nose pad 17 is engaged with a sliding member 56 movable along the rails 55 and integrally held to it. Reference numeral 14b denotes a lens receiver front plate, wherein at the rear surface are held a linear resistor 58a and an electric conductor 58b. To the sliding member 56 is fixed a brush 57, and the lens receiver front plate 14b is fixed to the lens receiver rear plate 14a in such a manner that one arm of the brush 57 is abutted against the linear resistor 58a and the other arm is abutted against the electric conductor 58b. As the result of detecting a variation of voltage by the sliding motion of the brush 57 on the linear 58a, an amount of lateral motion of the examined lens moved with the nose pad 17 is detected.

Figure 3:
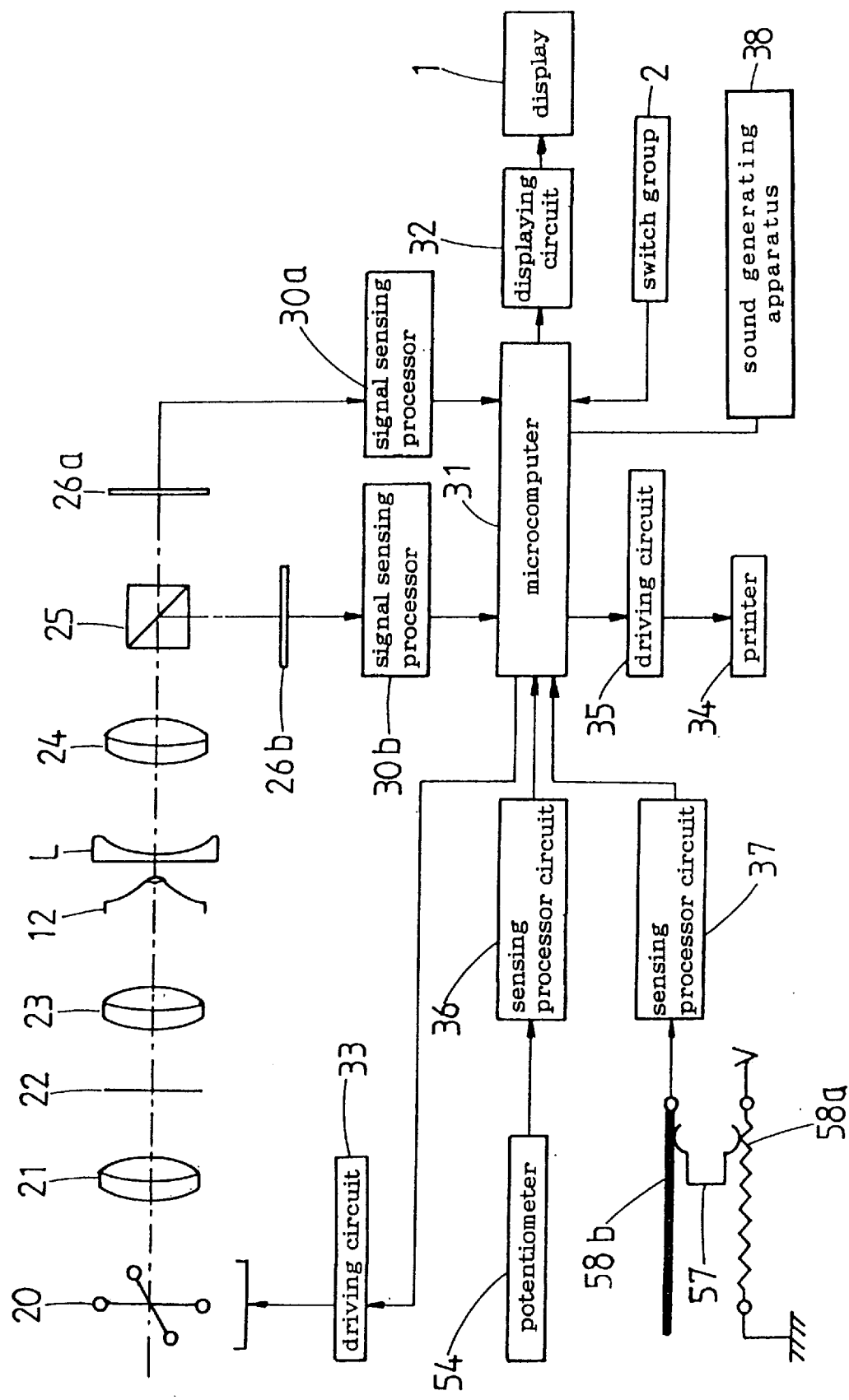
FIG. 3 is a view illustrating an optical system and a control system of the lens meter of the preferred embodiment.

FIG. 3 is a view for illustrating an optical system and a control system of the lens meter.

Reference numeral 20 denotes measuring light sources for LED and the like, wherein four light sources are arranged near the focal point of a condenser lens 21 while being crossed at a right angle with an optical axis and they are lit up in sequence when the measurement is carried out under control of a microcomputer 31. Reference numeral 22 denotes a measuring target having crossing slits and the target is fixed near the focal point of the condenser lens 21 and a collimating lens 23 or movable. The nose piece is arranged near the focal points of the collimating lens 23 and an image forming lens 24. Reference numeral 25 denotes a half prism, and reference numeral 26a, 26b denote two one-dimensional image sensors arranged in such a manner that they may be crossed to each other in respect to the optical axis and their sensing directions are crossed to each other.

Light projected from the measuring light sources 20 radiates against the measuring target 22 through the condenser lens 21. Light beam passed through the measuring target 22 is focused on each of the two crossing image sensors 26a and 26b through the collimating lens 23, the examined lens L and the image forming lens 24.

A relation between the refractive power of the examined lens and an image forming position of the measuring target will be described in brief. Each of the measuring light sources 20 is lit in sequence so as to illuminate the measuring target respectively. In the case that the examined lens is not present (or a lens having no refractive power is mounted), all the target images formed on the image sensors 26a and 26b under lit condition of each of the measuring light sources are overlapped from each other. In the case that the examined lens has only a spherical refractive power, a position of the target image on the image sensors 26a and 26b is moved only by the spherical refractivity. In the case that the examined lens has only a cylindrical refractive power, the light beam incident to the lens may apply a refractive power in such a direction crossing with a major diameter line at a right angle (or in the same direction). Accordingly, it is possible to get a spherical degree, an astigmatism degree, an astigmatism axial angle and a prism amount in response to a central coordinate of the target image formed through lighting of each of the measuring light sources 20s. Since this calculation process is basically the same as that disclosed in Japanese Patent Laid-Open No. 60-17335 (1985) (with the title of the invention of "Automatic Lens Meter") of the same applicant as that of the present invention, refer to it.

Each of the output signals produced from the image sensors 26a and 26b is processed by a signal sensing processor circuits 30a and 30b, and inputted to the microcomputer 31. The microcomputer 31 applies a predetermined calculating process to get the optical characteristics of the examined lens L.

In addition, a signal on moving information of the lens receiver 14 detected by the potentiometer 54 is processed by a sensing processor circuit 36 and inputted to the microcomputer 31. A voltage signal obtained by sliding the brush 57 on the linear resistor 58a and the electric conductor 58b is processed by the sensing processor circuit 37 and inputted to the microcomputer 31.

Reference numeral 32 denotes a displaying circuit for the display 1 and reference numeral 33 denotes a driving circuit for the measuring light source. Reference numeral 34 denotes a printer and reference numeral 35 denotes its driving circuit.

With such a device having the configuration as described above, its operation will be described as follows.

(A) Measurement of the single-focus lens before framing

In the apparatus of the present invention, the operator can select the method of reading measured data from either a manual storing measurement by a READ switch 4, or an automatic reading-and-storing measurement (hereinafter it is called "auto READ") by using a set screen in the display 1 by depressing the switch 2e corresponding to the menu switch 3e. At first, the operation of measuring a single-focus lens before framing will be described hereinafter.

Figure 4:
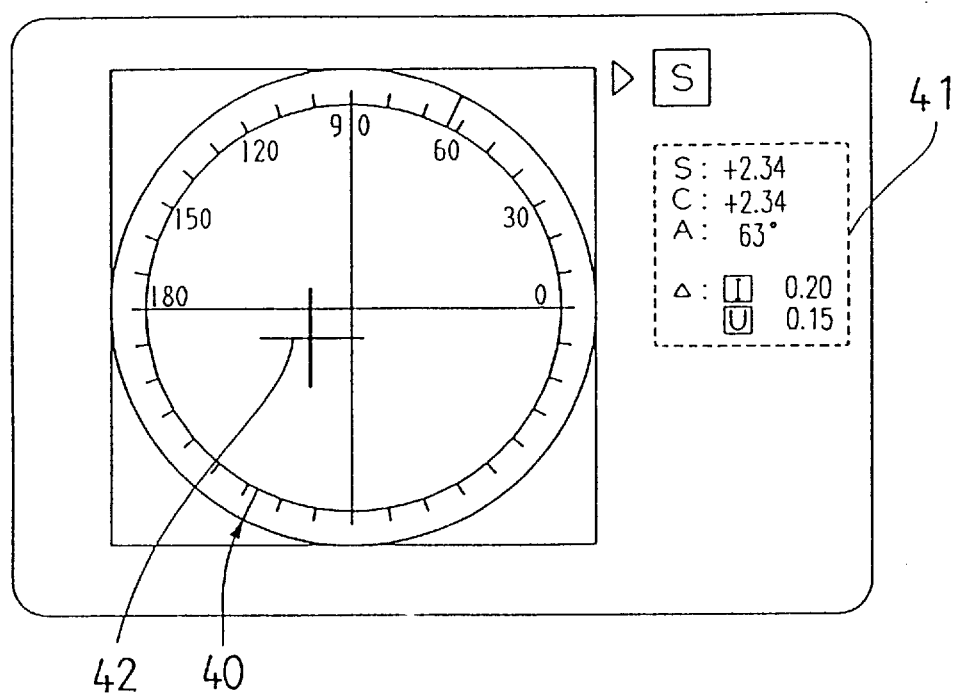
FIG. 4 is a view of an example of a screen illustrating a displayed state of a display under a measuring mode of a single-focus lens.

The operator sets to auto READ, and then, the operator changes a display screen to a measurement display. Next, the operator selects the measuring mode for measuring a single-focus lens by operating a switch 2b corresponding to a measuring mode changing-over switch display 3b. In the measuring mode of the single-focus lens, a reticle 40 is displayed at the display 1 as shown in FIG. 4 (a part of the screen is omitted in FIG. 4). The operator puts the lens on the nose piece 12 and supports the lens by using the lens fixer 13 as occasion calls. When the lens is mounted on the nose piece, the microcomputer 31 calculates a refractive power, and each measured data of spherical power, cylindrical power, cylindrical axial angle and prism degree is obtained. The measured data are respectively displayed at a measured data displaying section 41 on the display 1. The measurement is executed successively in a predetermined interval, then the value of the measured data displaying section 41 is always renewed and displayed corresponding to the variation of the value.

Also, the microcomputer 31 calculates a dislocation from the optical center of the lens to be examined on the basis of the prism degree, and displays a cross target 42 for alignment at the position corresponding to the dislocation. The operator moves the lens so that the cross target 42 is located at the center of the reticle 40. When the dislocation is within a predetermined permissible range, the cross target 42 changes to a large cross shape and informs the operator that the alignment is accomplished. At this time, during the predetermined period of time (1 second, for example), the microcomputer 31 judges whether the variation of each measured data is stable within the predetermined permissible range (for example, spherical degree and astigmatism degree are less than 0.06 D, astigmatism axial angle is less than 1°). As the measuring value used for judging, the data which is obtained by tracing back to the predetermined pieces of data (for instance, 3 data) can also be used instead of the predetermined period of time. Additionally, the operator can accomplish the auto READ on the condition that the variation of the respective measuring value is within the predetermined permissible range, and on another condition that the dislocation of the alignment is within the predetermined permissible range.

If it is judged that the measuring value is stable, the reading signal is generated and the value at this time is stored as optical characteristics by the memory of microcomputer 31. When the reading-and-storing of the measuring value is completed, microcomputer 31 gives instructions to a sound generating apparatus 38 to go into run and informs the operator of the completion of reading-and-storing measuring data. Then the measured data stored is held and displayed at the measured data displaying section 41

Figure 5:
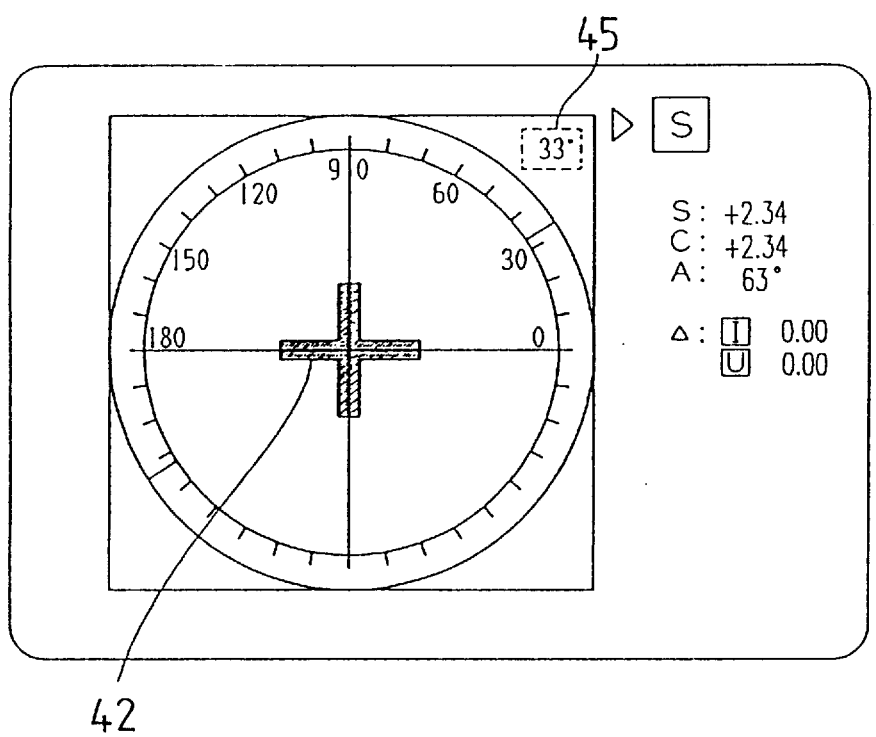
FIG. 5 is a view of an example of a screen illustrating a displayed state of a display under operating to adjust an optical angle, in the case of astigmatism.

The adjustment for attaching a mark to the lens will be described hereinafter. In the case that an astigmatism does not exist in the lens, a mark is directly attached by a marking apparatus 16. In the case that the astigmatism exists in the lens, an axial angle adjustment operation is started. When a measuring value is held, as shown in FIG. 5, an astigmatism axial angle is displayed at an area 45 of the display. At the measured data displaying section 41, the astigmatism axial angle which is held, kept displaying, however the data of the astigmatism axial angle which is measured by the axial angle, adjustment operation is displayed at the area 45 in the display. The operator revolves the lens so as not to move the center of the lens on the nose piece 12, and the operator adjusts an angle display of the area 45 so as to be a prescribed astigmatism axial angle. When the angle adjustment is completed, the lens is applied with a mark by the marking apparatus 16.

Additionally, in the case that the axial angle adjustment is necessary for marking, the value of the astigmatism axial angle is added as a condition of the auto READ, and then the auto READ can be performed when the alignment and the axial angle adjustment are completed together. In this case, a switch for setting the astigmatism axial angle is provided, and the operator inputs the prescribed astigmatism axial angle before measuring. The operator aligns the reticle 40 with cross target 42 based on the relation of the position and performs the axial angle adjustment by checking the value of the axial angle of the measured data displaying section 41. After the alignment is completed, at the same time, the astigmatism axial angle exists at the input position and the measured data is stable, and then the apparatus performs the auto READ. According to this auto READ, the operator can know that setting conditions for marking are completed.

In case that the prism prescription is needed, the operation will be accomplished as follows.

The operator depresses the switch 2e corresponding to the menu display 3e of the switch display 3 in order to select a prism degree input displaying. Additionally, the operator selects the method of inputting the prism degree on the polar coordinates or on the crossed coordinates, then inputs the prism data by following the instruction.

After the input operation is completed, the operator returns the display screen to the measuring display (same as FIG. 4), depresses switch 2f or 2g corresponding to the right-left selection switch display suited to the lens to be measured. Then, the operator puts the lens to be examined on the nose piece 12 and starts the measurement.

The apparatus calculates a decentering position from the optical center on the basis of the inputted prism degree in order to take the decentering position as the standard position of the reticle 40. The apparatus calculates a displacement from the standard position according to the prism degree of the lens to be examined on the measuring optical axis, as well as the method of calculating the optical center described above, and displays the cross target 42 for alignment at the position corresponding to the displacement. The operator moves the lens so that the center of the reticle 40 coincides with the cross target 42. The apparatus judges whether the variation of the measured data is stable within the predetermined range, and in the case that the data is stable, it reads and stores the measured data. In the case that astigmatism exists in the lens, as described above, the astigmatism axial angle is displayed at the area 45. The operator revolves the lens by following the display to accomplishes the angle adjustment, and then performs the marking operation.

As with the measurement by the auto READ described above, in general, even if the auto READ is selected, it is capable of storing the measured data obtained by depressing the read switch 4 as well. Moreover, after the measured data is stored by the auto READ, if the READ switch 4 is depressed, the measured data is stored in a memory, and the data which is held and displayed at the measured data displaying section 41 is also renewed.

Additionally, the auto READ is applied for not only measuring the single-focus lens but also for measuring a refractive power in the near or far viewing section of the progressive focus lens.

(B) Measurement of the lens mounted into a spectacle frame

Figure 6:
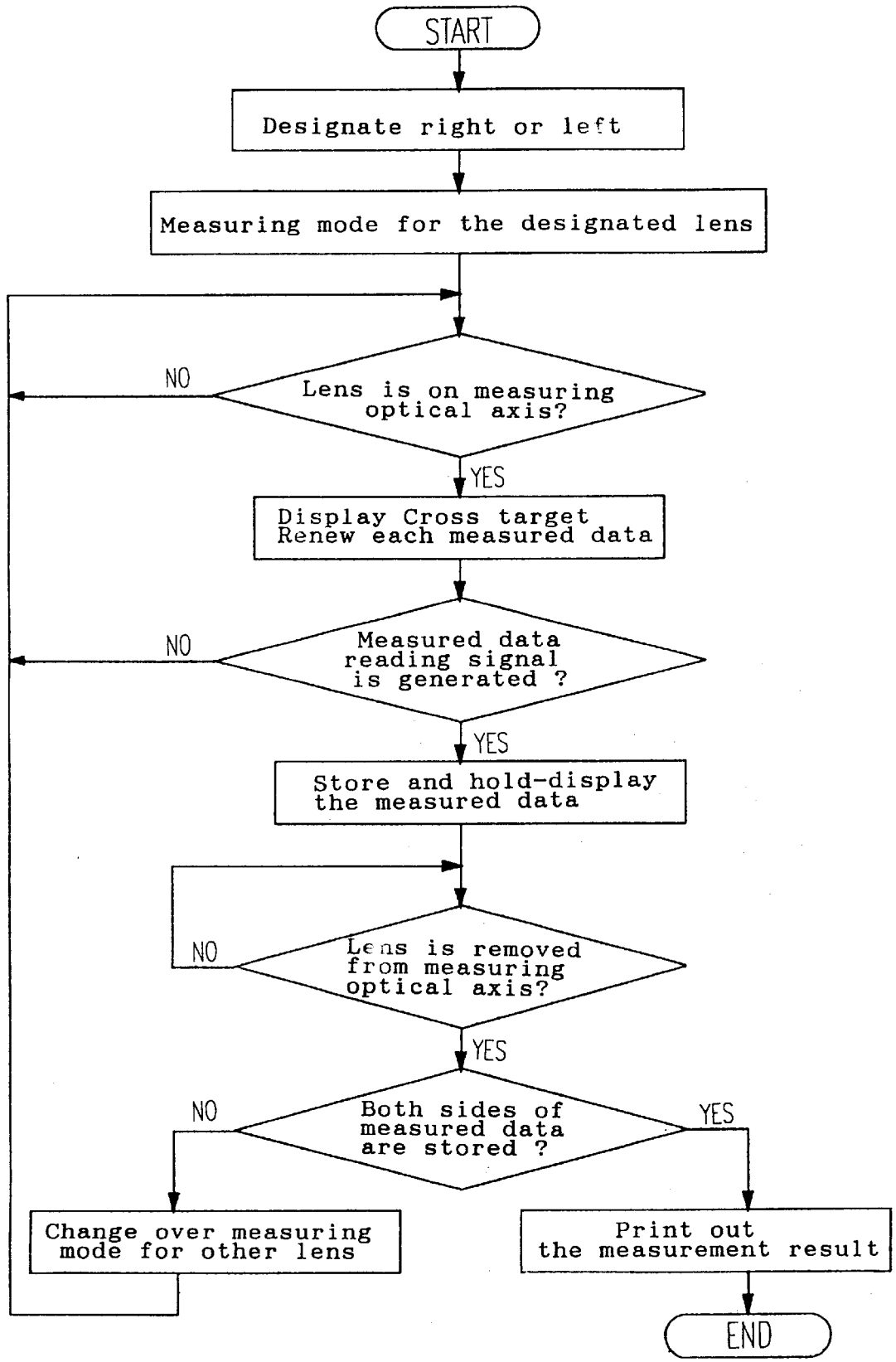
FIG. 6 is a flow chart illustrating a measuring operation of the framed lens.

The operation for measuring the lens mounted into a spectacle frame without using the nose pad 17 will be described on the basis of a flowchart shown in FIG. 6. Additionally, there is a mode for measuring a single-focus lens and the other mode for measuring a progressive lens as a measuring mode of the apparatus, though the mode for measuring a single-focus lens mode will be described hereinafter as an example (the selection of the measuring mode is performed by the operation of the switch group 2).

Figure 7:
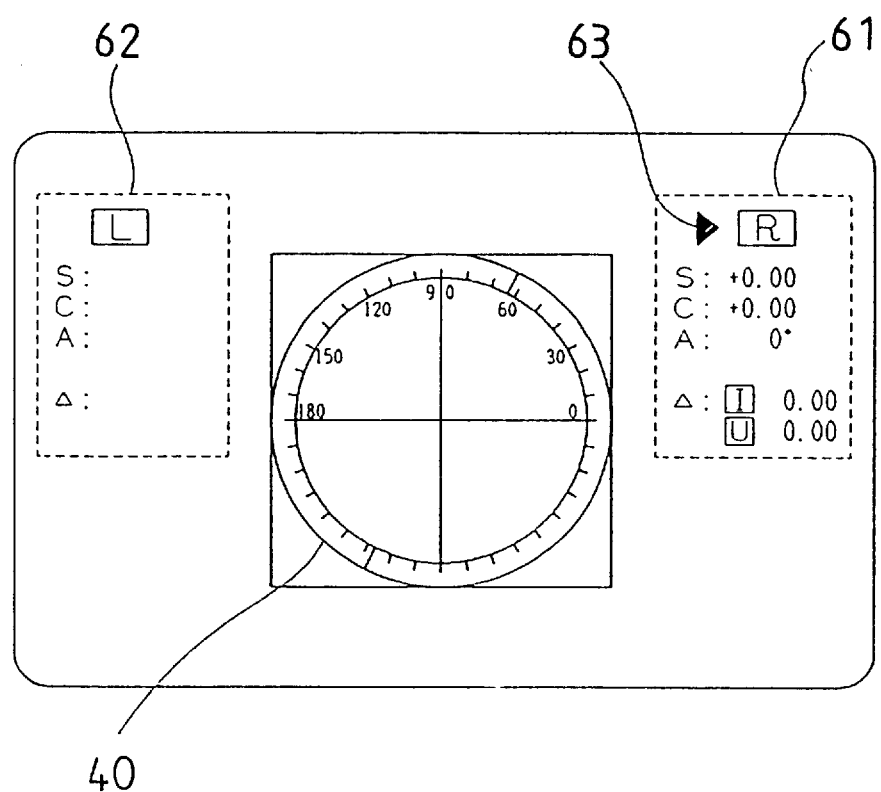
FIG. 7 is a view of an example of a screen illustrating a displayed state of a display, when starting a measurement of the right side of the framed lens under the measuring mode of the single-focus lens.

The operator depresses a switch 2f or 2g corresponding to the right-left selection switch display 3f and 3g in order to select the right or the left lens which is measured at first. For instance, the measurement of the right lens is started here. When a switch signal for selecting the right lens is inputted, the apparatus changes a mode for a measuring mode of the right lens. FIG. 7 is an example of a screen display of the display 1 at this time (in FIG. 7, a part of the display is omitted). Reference numeral 40 denotes a reticle for an alignment, 61 and 62 denotes measured data displaying section use in for indicating each right and left measured data, wherein the mark 63 indicates the right or left side of the present measuring lens.

The operator puts the selected right lens on the nose piece 12 holding the spectacle frame by hand. When the lens is put on the measuring optical axis, the microcomputer 31 calculates the refracting power to obtain each measured data of the spherical power, cylindrical power, cylindrical axial angle and prism quantity. The respective measured data of the right lens is displayed at the measured data displaying section 61 of rightward direction. The measurement is performed continuously in a predetermined interval, and the value of the measuring data displaying section 61 of the rightward direction is renewed and displayed depending on the variation of the measured data.

Also, the microcomputer 31 calculates a displacement of the lens from the optical center on the basis of the prism value, and displays a cross target 42 for alignment at the position corresponding to the displacement (same as FIG. 4) The operator moves the lens so that the center of the reticle 40 coincide with the cross target 42. When the displacement is within the predetermined permissible limits, the cross target 42 changes to a large cross shape so as to inform the operator that the alignment is completed.

As described above, when the operator selects the auto READ, the apparatus judges whether the measured data is stable, and if the measured data is stable, the apparatus generates the measured data reading signal and stores the measured data of the right lens in the memory (unless the auto READ is used, the measured data is read-and-stored by depressing the read switch 4).

When reading-and-storing of the measured data is completed, the apparatus makes a sound generating apparatus go into run and informs the operator that reading-and-storing of the measured data is completed and then holds-and-displays the stored measured data at the measured data displaying section 61.

When storing of the measured data of the right lens is completed, measurement of the left lens is started. The lens which has been measured is taken off from the measuring optical axis by changing a measuring lens to another. The microcomputer 31 detects the change according to whether the measured data obtained through the measuring optical system becomes about 0 or not (even if there is not a lens to be examined, the measured data includes some abberation, so for example, calculated equivalent spherical value is less than ±0.06 D, an astigmatism degree is less than 0.06 D, and a prism degree is less than 0.06 prism). That is, whether the lens is taken off (whether the lens is on the measurement optical axis) is detected according to whether the measurement result changes to about 0. When it is detected that the lens is taken off from the measurement optical axis, the microcomputer 31 confirms that the measured data of one side lens only has been stored, and then judges that the measurement of the one side lens is completed (the measurement completion can be judged according to that the lens is taken off from the measurement optical axis, but the lens is occasionally taken off by chance before the measured data is read and stored, therefore, it is better to confirm memory of the measured data). When the microcomputer 31 judges that the measurement of the one side lens has been completed, the microcomputer 31 changes the measuring mode of lateral direction to the mode of other (leftward) side. A mark 63 on the display 1 appears at a left side measuring data displaying section 62, and informs the operator that the mode is the left lens measuring mode.

The operator puts the left lens on the nose piece 12. As described above, the operator moves the lens so that the reticle 40 and the cross target 42 have predetermined relation and the operator starts the alignment. When the alignment is completed and the measured data is stable, the apparatus automatically generates the measured data reading signal, then stores the measured data of the left lens in memory. The measured data which is stored is held and displayed at the measured data displaying section 62 of left side.

When the measurement of the left lens has been completed, the operator takes off the lens from the nose piece 12. The microcomputer 31 detects that the lens has been taken off the measuring optical axis on the basis of the measurement result by obtaining continuously as well as described above, then confirms whether both of the right and left sides measured data are stored in the memory, and judges that the measurement of both lenses is completed. When the microcomputer 31 has judged that the measurement of both lenses lens has been completed, the microcomputer 31 generates an operating signal, transmits the operating signal to a printer driving circuit 35, and then makes a printer 34 go into run to print both side of measured data of the right and left lens stored in the memory. Also, in the case that the apparatus is connected to an ophthalmic apparatus, the measured data is data-transferred at the same time.

As has been described, the apparatus automatically makes the operation of changing a right and left lens measuring mode and of printing out and the like go into run, according to the detecting result whether the lens is on the measuring optical axis. Therefore, the troublesomeness of the switch operation is reduced, and the operator can carry out the measurement smoothly.

Further, the measured data is automatically read and stored, so the operator is released from the switch operation after the measurement is started, and then the operator can concentrate on holding the lens and the alignment, so the efficient measurement can be possible.

Additionally, respective automatic function such as changing-over of right/left lens measuring mode and printing out can be set respectively and independently in response to the state of the operator's use. As a matter of course, in the case that these automatic functions are set, the instruction signal generated by depressing the switch group 2 is also effective. For instance, after a mode is changed from a right lens measuring mode to a left lens measuring mode, if a switch 2g for selecting a right lens is depressed, the mode can be returned to the right lens measuring mode, and additionally, before the apparatus judges that the measurement has been completed, if a print switch 2a is depressed, it is capable of printing out.

As above, the present invention has been described with respect to measuring a single-focus lens, it is more practical for measuring an additive diopter of a multifocus lens or that of a progressive focus lens. That is, if the measurement is only for the single-focus lens, the measurement completion can be judged from the generation of a measured data reading signal. However, in the case of the lens, the additive diopter of which is measured, it is impossible to judge from this, because it is required to read and store the measured data of the far viewing section and then to store the measurement/read-and-store of the additive diopter section. Therefore, the measurement completion can be judged by detecting that the lens has been taken off from the measuring optical axis in the case of the lens, the additive diopter of which is measured, then the detecting signal can be available to accomplish automatically each operation such as changing-over the right/left lens measuring mode and printing out.

In addition, an auto READ function and a sensing function of lens existence are more practical for a lens meter which is used for an automatic carrier system in a lens manufacturer. That is, the control such as changing-over a lens and giving an instruction of reading-storing the measured data with respect to the measurement of lens carried automatically is accomplished by an external computer which is connected to a lens meter and gives an instruction respectively, so far. On the other hand, the lens meter of the present invention is automatically capable of detecting the lens change and capable of reading-and-storing a measured data by the auto READ, without the control of the external computer. Thus this lens meter can easily send communication data of the measurement result to the external apparatus with detection of the lens change or reading-and-storing of the measurement data as a start.

(C) Measurement of the progressive lens mounted into a spectacle frame

The operation, in the case that the progressive lens measuring mode is selected and that additive diopter of the progressive lens mounted into a spectacle frame is measured, will be described. The operator depresses the switch 2b corresponding to the switch display 3b to select a progressive multifocus lens measuring mode. On the condition that the lens to be examined is not put on as shown in FIG. 1, an alignment circle 70 having two curved lines imitating a progressive multifocus lens and a guide 71 area are displayed in the screen of the display 1. On both sides of the alignment circle 70 are displayed one of each of the right and left measurement values, respectively.

Switches in the switch group 2 for the selection of right and left lenses are depressed to specify the right or left lens in compliance with the lens to be measured (right and left lenses of spectacles can be discriminated in reference to the positional signal of the nose pad 17; it may also be applicable that the switch operation for selecting the right or left lens can be eliminated). As shown in FIG. 1, the operator causes the lower side of the lens when the spectacles are worn (the upper and lower positions of the frame and the lens expressed in the specification are meant by the upper and lower orientations under a state in which the spectacles are worn by the user) to be abutted against the lens receiver 14 and concurrently the nose pads of the frame are abutted against the nose pad 17. Under this condition movement adjustment is carried out in such a manner that a slight upper part of the examined lens to be measured may occupy a location on the nose piece 12. Then, the movement of the lens to be examined in the measurement operation is carried out together with the lens receiver 14 and the nose pad 17.

Figure 8A:
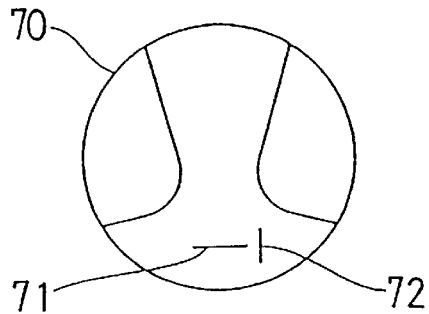
FIGS. 8(*a*) to 8(*f*) views illustrating a displayed state of a display under a measuring mode of a progressive lens.

Upon locating the examined lens on the measuring optical axis, a progressive target 72 is displayed on either the right side or the left side of the guide 71 in the alignment circuit 70 on the screen (FIG. 8(a)). The guide 71 indicates a moving target on a reference ordinate line and the position of the progressive target 72 indicates a direction of which the examined lens should be moved. The microcomputer 31 calculates a relative position of the progressive target 72 with respect to the guide 71 as follows in response to the prism value of each of the measuring points. In the case that the examined lens has only a spherical refractive power, the far viewing section of the lens is positioned on an axis where the prism value may become approximately 0, so that the position of the progressive target 72 is controlled through increasing or decreasing of the prism value by lateral motion of the lens. In the case that the examined lens has a cylindrical refractive power, the position where the prism value of the examined lens in the lateral direction becomes 0 is placed on an astigmatism axis, so that an influence caused by the cylindrical refractive power from the prism values at each of the measuring points is corrected by applying a predetermined calculating process so as to perform control over the position of the progressive target 72. As for the correcting process of influence caused by the cylindrical surface refractive power, the description of Japanese Patent Laid-Open No. 6-58842 (1994) (titled "Lens Meter and Its Measuring Method") of the same applicant as that of the present invention of U.S. Pat. No. 5,379,111 of "LENS METER" is applied.

Figure 8B:
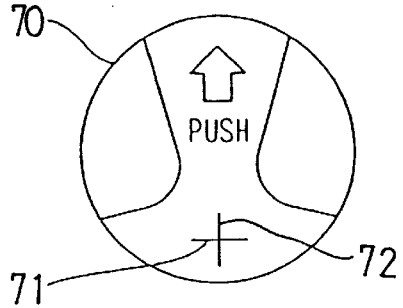
Figure 8C:
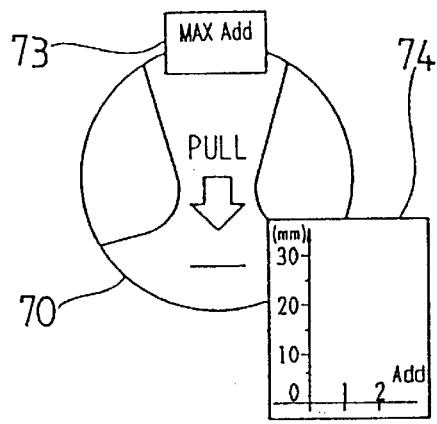
Figure 8D:
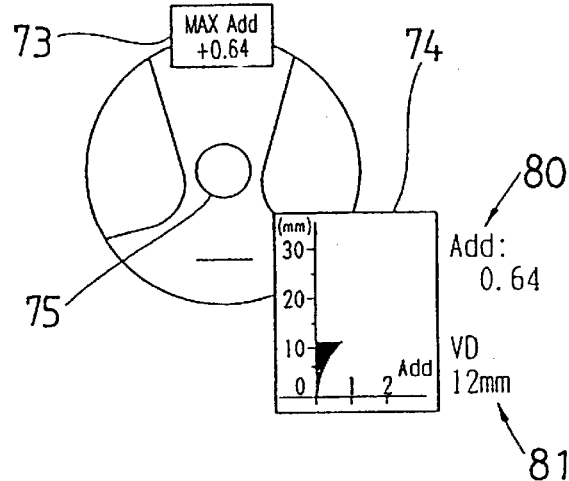
Figure 8E:
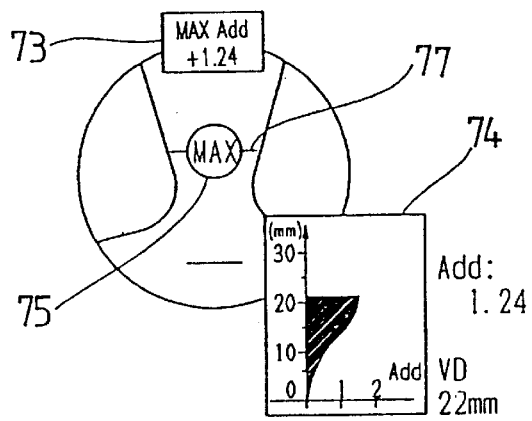
Figure 8F:
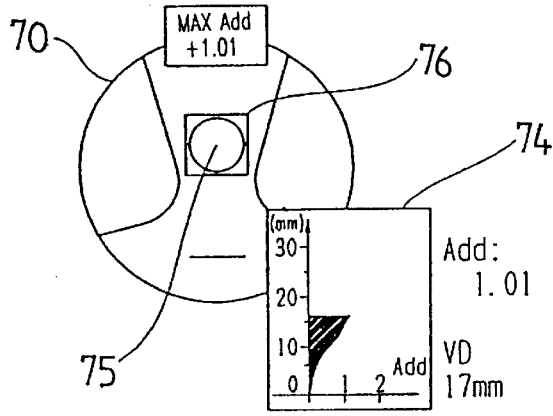

The operator moves the lens in the lateral direction in such a manner that the progressive target 72 may approach the center of the guide 71 (this indicates that in FIG. 8(a), the lens is moved in the leftward direction toward the device). When the center of the progressive target 72 is in compliance with the guide 71, a guidance display mark of "PUSH ↑" meaning that the lens is moved toward a deep side in the alignment circle 70 appears (FIG. 8(b)).

The operator moves the lens toward the deep side of the device in accordance with the guidance display. The device gets measurement values continuously in a predetermined interval, and with no variation in the additive diopter (spherical degree) upon movement, deletes "PUSH ↑" on the screen, displays the guide 71 in a large cross shape and informs the operator that the measuring point is placed at the far viewing section. Subsequently, upon stabilization of the measurement value for a predetermined period of time (1 second, for example), the device automatically reads in the measurement value at this time and stores it.

Upon storing the measurement values at the far viewing section, an operation of the device is automatically transferred to a measuring step for the near viewing section. On the screen are displayed a guidance display mark of "PULL ↓" meaning that the lens should be moved toward the operator, a displaying part 73 displaying the maximum value of the additive diopter at the upper part of the alignment circle 70 and an additive diopter graph 74 indicating a state of increasing the additive diopter (FIG. 8(*c*)). The additive diopter graph 74 has an additive diopter at an abscissa and a distance from an additive diopter starting position at an ordinate.

The operator moves gradually the lens receiver 14 toward the operator together with the lens in accordance with the guidance display. During motion of the lens, the device gets measurement values in a consecutive manner and detects an additive diopter starting position from the variation in additive diopter per unit movement amount. Upon detection of the additive diopter starting position, it gets a signal detected by the potentiometer 54 and the additive diopter starting position is set at the reference position in the forward or rearward direction. The reference position can be set in the far viewing section.

Upon entering of the measuring point in the progressive section, the guidance display of "PULL ↓" disappears, and a corona target 75 appears (FIG. 8(*d*)). The operator moves the lens and the lens receiver 14 toward the near viewing section. Upon passing of the lens through the progressive section, the corona target 75 is moved upward on the alignment circle 70. Also, upon entering of measuring point in the progressive section, the device detects the variation in the astigmatism degree and monitors such that the measuring point may not be shifted at the right and left sides of the progressive section. Upon displacement of the point corona target 75 out of the curved line of corona target 75 is displayed at a position slightly displaced out of the curved line of the progressive section. Upon displacement of the corona target 75 out of the curved line of the progressive section, the motion in the lateral direction is corrected.

Figure 9:
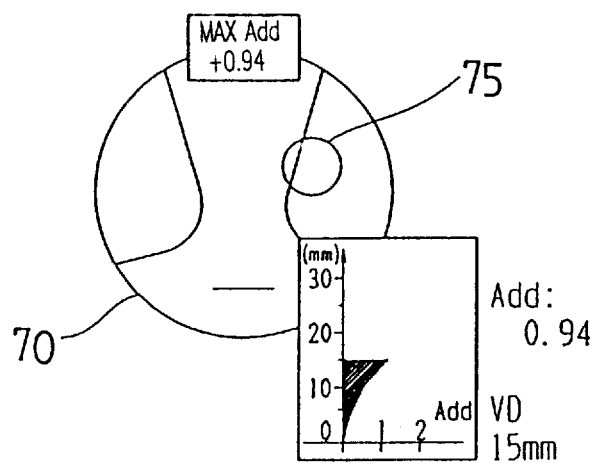
FIGS. 9(*a*) to 9(*b*) are views illustrating a display when a measuring point is set out of the predetermined position closed to nose position under a measuring mode of a progressive lens.
Figure 9:
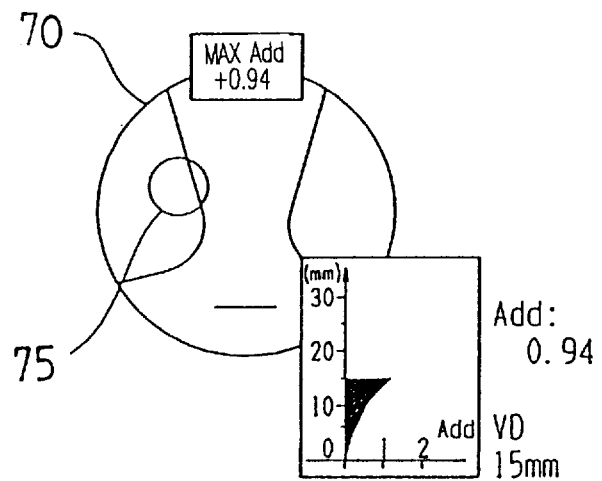

Further, upon the measuring point reaching a predetermined distance (8 mm, for instance) from the additive starting position, the apparatus starts keeping watch on the lateral direction of the measuring point. It is judged whether the measuring point is placed at the predetermined distance from a standard longitudinal axis close to the nose position (majority of lens being on the market have displacement about 1.5~2.5 mm from the center of the far viewing section to the center of the near viewing section, for instance, the distance is stored as 2.0 mm in advance). The nose side direction of the lens is determined by a right-left selecting signal, then it is possible to recognize a displacement and the direction according to this signal and a position signal of the nose pad 17. As the result of this, when the measuring point is displace beyond the predetermined distance close to the nose position, as shown in FIG. 9, the corona target 75 is displayed at the position slightly beyond the curved line of the progressive section (in FIG. 9(*a*), as displaced the right side, it means that the lens should be moved in the right direction). When the corona target 75 is displaced out of the curved line of the progressive section, the lens movement in the lateral direction is adjusted slightly so as to return the corona target 75 within the alignment 70.

In addition, the device judges whether the additive diopter per unit movement amount is increased, and if the additive diopter is increased, the displaying of the additive diopter at the displaying part 73 is revised. In the case that the additive diopter is not increased, the measuring value of the additive diopter at that time is held and displayed at the displaying part 73. And a MAX bar 77 is displayed on upper position of the alignment circle 70 of the measured point where the maximum value of the additive diopter is attained, in response to the sensing result of the potentiometer 54 (FIG. 8(*e*)).

A state of increasing of that value is displayed at an additive diopter graph 74. There is a display 80 for use in displaying the additive diopter at the measuring point, and a display 81 for use in displaying the distance with numerical value at the side of the additive diopter graph 74.

As described above, the alignment toward the near viewing section, of which the lateral direction is performed in compliance with the displaying position of the corona target 75 and of which the upper and lower direction is performed in compliance with the position of the MAX bar 77, can be performed easily. When the MAX bar 77 is superposed on the corona target 75, the operator depresses the read switch 4 (or automatically), and the apparatus stores the measured data, and then the measurement ends.

Additionally, the lateral direction guidance display can be also indicated by an arrow post, or can be also indicated by adjusting the center of the corona target to a guidance line.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter having a measuring optical system for projecting a measuring light flux on a lens to be examined and detecting a position of an image formed on a light receiving element by the measuring light flux transmitted through the examined lens, calculating means for calculating a refractive power of the lens on the basis of a measurement result from said measuring optical system, and control means for controlling an operation of an apparatus, the lens meter comprising:

mode changing-over means for changing-over a measuring mode to each of a progressive multifocus lens measuring mode and a single focus lens measuring mode;

alignment means for moving the lens to a desired position with respect to a measuring optical axis of said measuring optical system on the basis of a prism degree obtained by operation of said measuring optical system and said calculating means;

judging means for judging whether the prism degree is within predetermined limits and that the refractive power is stable within predetermined limits of variation;

store signal generating means for generating a signal for storing the refractive power as the refractive power of the lens when said judging means judges the prism degree is within the predetermined limits and that the refractive power is stable within the predetermined limits of variation; and memory means for storing the refractive power when said store signal generating means generates a store signal as the refractive power of the lens.

2. The lens meter according to claim 1, further comprising:

first display means for displaying the refractive power of the lens stored by said memory means; and second display means for displaying an astigmatism axis angle of the lens when a mark is to be attached to the lens.

3. The lens meter according to claim 1, wherein said alignment means comprises conduction means for conducting a measuring position close to a near viewing section through a progressive section from a far viewing section when the measuring mode is changed-over to the progressive multifocus lens measuring mode.

4. The lens meter according to claim 3, wherein said conduction means comprises:
   first conduction means for conducting the measuring position to a reference ordinate line of the lens based on the prism degree; and
   second conduction means for conducting the measuring position close to the near viewing section through the progressive section from the far viewing section based on a measured astigmatism refractive power.

5. The lens meter according to claim 3, further comprising detecting means for detecting a displacement in a lateral direction of the lens, wherein said conduction means comprises:
   first conduction means for conducting the measuring position to a reference ordinate line of the lens based on the prism degree;
   second conduction means for conducting the measuring position close to the near viewing section through the progressive section from the far viewing section based on a measured astigmatism refractive power; and
   third conduction means for conducting the measuring position to a predetermined nose side based on a detecting result by said detecting means.

6. The lens meter according to claim 5, further comprising input means for inputting a degree conducted to a nose side by said third conduction means.

7. A lens meter having a measuring optical system for projecting a measuring light flux on a lens to be examined and detecting a position of an image formed on a light receiving element by the measuring light flux transmitted through the examined lens, calculating means for calculating a refractive power of the lens on the basis of a measurement result from said measuring optical system, and control means for controlling an operation of an apparatus, the lens meter comprising:
   mode changing-over means for changing-over a measuring mode to each of a progressive multifocus lens measuring mode and a single focus lens measuring mode;
   judging means for judging whether a prism degree obtained by operation of said measuring optical system and said calculating means is within predetermined limits and that the refractive power is stable within predetermined limits of variation, said judging means having alignment means for moving the lens to a desired position with respect to a measuring optical axis in said measuring optical system, said alignment means comprising:
      first conduction means for conducting the lens to the desired position with respect to the measuring optical axis in said measuring optical system based on the prism degree when the measuring mode is changed-over to said single focus lens measuring mode, and for conducting a measuring position to a reference ordinate line of the lens based on the prism degree when the measuring mode is changed-over to said progressive multifocus lens measuring mode; and
      second conduction means for conducting the measuring position close to a near viewing section through a progressive section from a far viewing section based on a measured astigmatism refractive power;
   store signal generating means for generating a signal for storing the refractive power as the refractive power of the lens when said judging means judges that the prism degree is stable within predetermined limits and that the refractive power is within predetermined limits of variation; and
   memory means for storing the refractive power when said store signal generating means generates a store signal as the refractive power of the lens.

8. The lens meter according to claim 7, further having detecting means for detecting a displacement in a lateral direction of the lens, wherein said alignment means, when the measuring mode is changed-over to said progressive multifocus lens measuring mode further comprises third conduction means for conducting the measuring position to a predetermined nose side based on a detecting result by said detecting means.

9. A lens meter having a measuring optical system for projecting a measuring light flux on a lens to be examined and detecting a position of an image formed on a light receiving element by the measuring light flux transmitted through the examined lens, calculating means for calculating a refractive power of the lens on the basis of a measurement result from said measuring optical system, and control means for controlling an operation of an apparatus, the lens meter comprising:
   mode changing-over means for changing-over a measuring mode to each of a progressive multifocus lens measuring mode and a single focus lens measuring mode;
   detecting means for detecting a displacement in a lateral direction of the lens;
   store signal generating means for generating a signal for storing the refractive power as the refractive power of the lens, said store signal generating means having alignment means for moving the lens to a desired position with respect to a measuring optical axis in said measuring optical system, said alignment means comprising:
      first conduction means for conducting the lens to the desired position with respect to the measuring optical axis in said measuring optical system based on a prism degree, obtained by operation of said measuring optical system and said calculating means when the measuring mode is changed-over to said single focus lens measuring mode, and for conducting a measuring position to a reference ordinate line of the lens based on the prism degree, when the measuring mode is changed-over to said progressive multifocus lens measuring mode;
      second conduction means for conducting the measuring position close to a near viewing section through a progressive section from a far viewing section based on a measured astigmatism refractive power; and
      third conduction means for conducting the measuring position to a predetermined nose side based on a detecting result by said detecting means; and
   memory means for storing the refractive power when said store signal generating means generates a store signal as the refractive power of the lens.

10. The lens meter according to claim 9, further comprising input means for inputting a degree conducted to a nose side by said third conduction means.

* * * * *